United States Patent Office 2,967,126
Patented Jan. 3, 1961

2,967,126

PRODUCTION OF PESTICIDAL COMPOUNDS

Alfred A. Levin and Hyman M. Molotsky, Chicago, Ill., assignors to Velsicol Chemical Corporation, Chicago, Ill., a corporation of Illinois No Drawing. Filed Feb. 11, 1959, Ser. No. 792,471

8 Claims. (Cl. 167—30)

This invention relates to new compositions of matter. More specifically, this invention relates to new chemical compounds of the formula

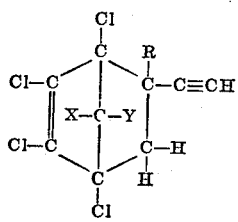

wherein X and Y are selected from the group consisting of chlorine and hydrogen atoms and R is selected from the group consisting of a hydrogen atom and the radical —$CH_3$. These new compounds are useful as chemical intermediates and as pesticides, particularly as fungicides.

The compounds of this invention can be prepared by the addition of the appropriate chlorinated cyclopentadiene to 1-buten-3-yne (vinylacetylene) or 2-methyl-1-buten-3-yne (isopropenyl acetylene). At least equimolecular amounts of the reactants should be used, but it is desirable to use an excess of the halogenated cyclopentadiene. No solvent is normally required for the reaction, although inert solvents can be used if desired. The precise reaction temperature is not critical, but the use of a temperature below about 100° C. is preferred. The reaction can be carried out satisfactorily at normal atmospheric pressure or at superatmospheric pressures if desired. Improved yields of the compounds of this invention are obtained by the use of hydrogen chloride scavengers such as calcium carbonate, propylene oxide, or phenoxypropylene oxide in the reaction mixture. The reaction product can be isolated chromatographically, by fractional distillation, by crystallization from a suitable solvent, or other techniques known to those skilled in the art.

Chlorinated cyclopentadienes suitable for preparing the compounds of this invention are hexachlorocyclopentadiene (a chemical of commerce), 1,2,3,4,5-pentachlorocyclopentadiene, or 1,2,3,4-tetrachlorocyclopentadiene. The latter two compounds can be obtained, for example, by the catalytic hydrogenation of hexachlorocyclopentadiene in the presence of a platinum or palladium catalyst as described by McBee and Smith, J. Am. Chem. Soc. 77, 389 (1955). When hexachlorocyclopentadiene is used as the starting material, both X and Y are chlorine atoms in the final product. When 1,2,3,4,5-pentachlorocyclopentadiene is used, one of X or Y is a chlorine atom and the other is a hydrogen atom. When 1,2,3,4-tetrachlorocyclopentadiene is used, both X and Y are hydrogen atoms. The identity of R as a hydrogen atom or as the radical —$CH_3$ in the final products is obtained by the use of 1-buten-3-yne or 2-methyl-1-buten-3-yne, respectively, in the addition reaction.

The manner in which the compounds of this invention can be prepared is illustrated in the following examples.

EXAMPLE 1

Preparation of 5-ethynyl-5-methyl-1,2,3,4,7,7-hexachlorobicyclo(2.2.1)-2-heptene A mixture of hexachlorocyclopentadiene (280 g.; 1.09 moles), anhydrous calcium carbonate (20 g.) and phenoxypropylene oxide (2.7 g.) was heated to 85°–90° C. in a round-bottom flask fitted with a mechanical stirrer, reflux condenser, internal thermometer, and dropping funnel. 2-methyl-1-buten-3-yne (35 g.; 0.5 mole) was added dropwise with stirring at this temperature over a period of 3 hours. The reaction mixture was then stirred and maintained at a temperature of 85°–90° C. for 36 hours. The calcium salt was then filtered off, and the filtrate was chromatographed on a Florex XXS column with n-pentane as the eluent. The first fraction obtained was unreacted hexachlorocyclopentadiene. The second fraction was stripped of pentane in vacuo to give a 50% yield (based on the unreacted hexachlorocyclopentadiene) of 5-ethynyl-5-methyl-1,2,3,4,7,7-hexachlorobicyclo(2.2.1)-2-heptene, a viscous oil having an index of refraction (D line) of 1.5723 at 20° C.

Analysis for $C_{10}H_6Cl_6$.—Theory: C, 35.44%; H, 1.78%; Cl, 62.77%. Found: C, 34.87%; H, 1.86%; Cl, 62.50%.

Other new compounds within the scope of this invention which can be prepared in the manner detailed above are given in the following examples. Listed are the appropriate butenyne to be used for reaction with the chlorinated cyclopentadiene to give the named compounds of this invention. For brevity, the chlorinated cyclopentadienes 1,2,3,4-tetrachloro-, 1,2,3,4,5-pentachloro-, and hexachlorocyclopentadiene are identified as A, B, and C, respectively.

EXAMPLE 2

1 - buten - 3 - yne+C=5 - ethynyl-1,2,3,4,7,7 - hexachlorobicyclo(2.2.1)-2-heptene.

EXAMPLE 3

1 - buten - 3 - yne+A=5 - ethynyl - 1,2,3,4 - tetrachlorobicyclo(2.2.1)-2-heptene.

EXAMPLE 4

1 - buten - 3 - yne+B=5 - ethynyl-1,2,3,4,7-pentachlorobicyclo(2.2.1)-2-heptene.

EXAMPLE 5

2 - methyl - 1 - buten-3-yne+A=5-ethynyl-5-methyl-1,2,3,4-tetrachlorobicyclo(2.2.1)-2-heptane.

EXAMPLE 6

2 - methyl - 1 - buten-3-yne+B=5-ethynyl-5-methyl-1,2,3,4,7-pentachlorobicyclo(2.2.1)-2-heptene.

Workers skilled in the art will recognize the utility of the new compounds of this invention as chemical intermediates. The highly chlorinated bicyclic ring structure combined with the highly reactive triple bond and terminal hydrogen atom in the ethynyl group make possible the synthesis of a wide variety of useful chemical compounds heretofore unobtainable.

The compounds of this invention, however, are also useful as pesticides, particularly as fungicides. Thus, experiments on the toxicity of experimental compounds to test spores was determined by the slide germination technique adopted by the Committee on Standardization of Fungicidal Tests of the American Phytopathological Society. Measured concentrations of spores were placed on glass slides in contact with various concentrations of the compound being tested. The percentage germination of spores was then determined for each treatment after 24 hours' incubation at 72° F. Two replicates were run at each concentration. The results obtained with the product of Example 1, namely 5-ethynyl-5-methyl-1,2,3,4,7,7-hexachlorobicyclo(2.2.1)-2-heptene, are summarized as an example in the table below.

| Concn., p.p.m. | Organism | Percent Spore Germination | | | ED50,[1] p.p.m. |
|---|---|---|---|---|---|
| | | Rep. 1 | Rep. 2 | Ave. | |
| 100 | *Fusarium roseum* | 0 | 0 | 0 | 2.5 |
| 100 | *Monilinia fructicola* | 0 | 0 | 0 | 0.7 |

[1] Effective dosage for 50% control.

Experiments were also carried out for the control of bean rust on bean foliage. Pinto bean seedlings, grown under greenhouse conditions, were mounted on a special compound turntable and sprayed with the test compounds at various concentrations for 30 seconds at 30 pounds' pressure. The plants were allowed to dry, inoculated with spore suspensions of the bean rust organism (*Uromyces phaseoli*), and placed in an incubation chamber for 24 to 48 hours. The plants were then removed and maintained under greenhouse conditions for 10 to 14 days. The number of rust pustules on the leaves of each plant were then determined. In these experiments, the compound of Example 1 gave 82% control of the bean rust at a concentration of 100 p.p.m.

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound, or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, lecithin, di- and higher polyhydric alcohol fatty acid esters, cholestrol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 7

Preparation of an emulsifiable concentrate

The following ingredients are blended thoroughly until a homogeneous liquid concentrate is obtained. This concentrate is mixed with water to give an aqueous dispersion containing the desired concentration of active compound for use as a spray.

| | |
|---|---|
| 5-ethynyl-5-methyl-1,2,3,4,7,7-hexachlorobicyclo (2.2.1)-2-heptene | 25 |
| Sodium lauryl sulfate | 2 |
| Sodium lignin sulfonate | 3 |
| Kerosene | 70 |

EXAMPLE 8

Preparation of a wettable powder

The following components are mixed intimately in conventional mixing or blending equipment and are then ground to a powder having an average particle size of less than about 50 microns. The finished powder is dispersed in water to give the desired concentration of active compound.

| | |
|---|---|
| 5-ethynyl-1,2,3,4,7,7-hexachlorobicyclo (2.2.1)-2-heptene | 75.00 |
| Fuller's earth | 22.75 |
| Sodium lauryl sulfate | 2.00 |
| Methyl cellulose | .25 |

EXAMPLE 9

Preparation of an oil-dispersible powder

The following components are blended and ground as described in the previous example to give a powder which can be dispersed in oil to form a spray containing the desired concentration of active compound.

| | |
|---|---|
| 5-ethynyl-5-methyl-1,2,3,4-tetrachlorobicyclo (2.2.1)-2-heptene | 70 |
| Condensation product of diamylphenol with ethylene oxide | 4 |
| Fuller's earth | 26 |

EXAMPLE 10

Preparation of a dust

The following ingredients are mixed thoroughly and then ground to an average particle size of less than about 50 microns to give a dust suitable for application with conventional dusting equipment.

| | |
|---|---|
| 5-ethynyl-1,2,3,4-tetrachlorobicyclo(2.2.1)-2-heptene | 20 |
| Talc | 80 |

EXAMPLE 11

Preparation of a granular formulation

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

| | |
|---|---|
| 5-ethynyl - 5 - methyl - 1,2,3,4,7 - pentachlorobicyclo (2.2.1)-2-heptene | 10 |
| Fuller's earth | 66 |
| Dextrin | 20 |
| Sodium lignin sulfonate | 3 |
| Kerosene | 1 |

When the compounds and compositions of this invention are used as fungicides to control or prevent plant diseases caused by fungi or bacteria, they are used in several ways, depending on the particular chemical, the nature of the disease, and the nature of the plant attacked. They may be used as preventive agents to form a toxic barrier between the inoculum and the host tissue, to inhibit the production of inoculum, or to destroy the inoculum before it reaches the site of infection. They may be used as eradicating agents to destroy the disease-producing organism or its inoculum on the host tissue or in the soil. They may be used as curatives or therapeutic agents to destroy the disease-producing organisms within the plant tissues, halt their growth, or inhibit the development of their toxins or counteract them. They may also be used as prophylactic agents to immunize plants against disease. The compounds of this invention can be useful in any one or more of the above ways, but since it is much easier to protect plants from disease rather than to cure disease, the chemicals are best used in the form of protectants. These protective chemicals can act to prevent sporulation and thus reduce or eliminate the inoculum necessary for the spread of a disease. They can also prevent spores from completing their germination or incubation stage so that no infection ensues. These eradicant chemicals, which can also be considered broadly as protectants, are used to destroy disease-producing organisms or their inoculum in the soil, in dead plant organs, or on living plant tissue. When used to treat soil or seed, these compounds are usually referred to as disinfectants or disinfestants. The compounds of this invention are also useful for the control of fungal growth on wood, plastics, textiles, and like materials.

When used for the control of plant diseases, the compounds of this invention can be used as seed treatments, soil treatments, or plant treatments. Many of the disease-producing bacteria and the fungi that cause blights, spots, and rots are carried on or in seeds, roots, bulbs, tubers, corms, or other seed stock that is purchased by growers. These disease-producing organisms can be destroyed by dipping the seed or planting stock in liquid formulations of the compounds of this invention. Many plant pathogens are also soil-borne, and the application of the active compounds to the soil is one of the useful methods for control or eradication of the organisms, particularly in greenhouses, cold frames, hotbeds, and seedbeds. Both solid and liquid compositions of the compounds of this invention can be used in such soil treatments, which are also effective for soil nematode control. Plant treatments by chemicals in the form of liquid or solid fungicidal compositions are made on growing crops or on crop residues either to prevent the appearance or spread of diseases or to destroy the disease-causing organisms already present or both. This type of treatment is essential for plant protection from air-borne pathogenes and is also useful in controlling many seed- and soil-borne pathogenes that spread externally to the upper parts of plants. Such treatment includes the application of the active chemicals internally to prevent or destroy diseased conditions. The active compounds of this invention are applied by any of these methods in amounts sufficient to exert the desired pesticidal action. The amount of the active compound present in the pesticidal compositions as actually applied for destroying or preventing pest infestations varies with the type of application, the particular pests which are to be controlled, the purpose for which the treatment is made, and the like. Generally, the solid or liquid pesticidal compositions of this invention will contain from about 0.5% to about 90% of the active compounds.

We claim:

1. A compound of the formula

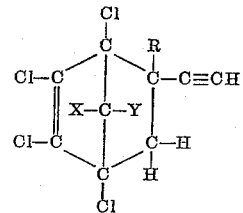

wherein X and Y are selected from the group consisting of chlorine and hydrogen atoms and R is selected from the group consisting of a hydrogen atom and the radical —CH$_3$.

2. 5-ethynyl-5-methyl - 1,2,3,4,7,7 - hexachlorobicyclo (2.2.1)-2-heptene.

3. 5-ethynyl-1,2,3,4,7,7 - hexachlorobicyclo(2.2.1) - 2-heptene.

4. 5-ethynyl - 5 - methyl - 1,2,3,4 - tetrachlorobicyclo (2.2.1)-2-heptene.

5. 5-ethynyl - 1,2,3,4 - tetrachlorobicyclo(2.2.1)-2-heptene.

6. 5-ethynyl - 5 - methyl - 1,2,3,4,7-pentachlorobicyclo (2.2.1)-2-heptene.

7. A fungicidal composition comprising an inert carrier and a toxic amount of a compound of claim 1.

8. A method of destroying undesirable fungi which comprises contacting said fungi with a fungicidal composition comprising an inert carrier and as the essential active ingredient, in a quantity which is injurious to said fungi, a compound of claim 1.

No references cited.

UNITED STATES PATENT OFFICE
CERTIFICATION OF CORRECTION

Patent No. 2,967,126                     January 3, 1961

Alfred A. Levin et al.

It is hereby certified that error appears in the above numbered patent requiring correction and that the said Letters Patent should read as corrected below.

Column 2, line 53, Example 5, for "heptane" read -- heptene --.

Signed and sealed this 13th day of June 1961.

(SEAL)
Attest:

ERNEST W. SWIDER
Attesting Officer

DAVID L. LADD
Commissioner of Patents